Jan. 15, 1957  J. D. COCHIN  2,777,538
VEHICLE FRAME ENGAGING ACCESSORY FOR AUTOMOBILE HOISTS
Original Filed July 27, 1953
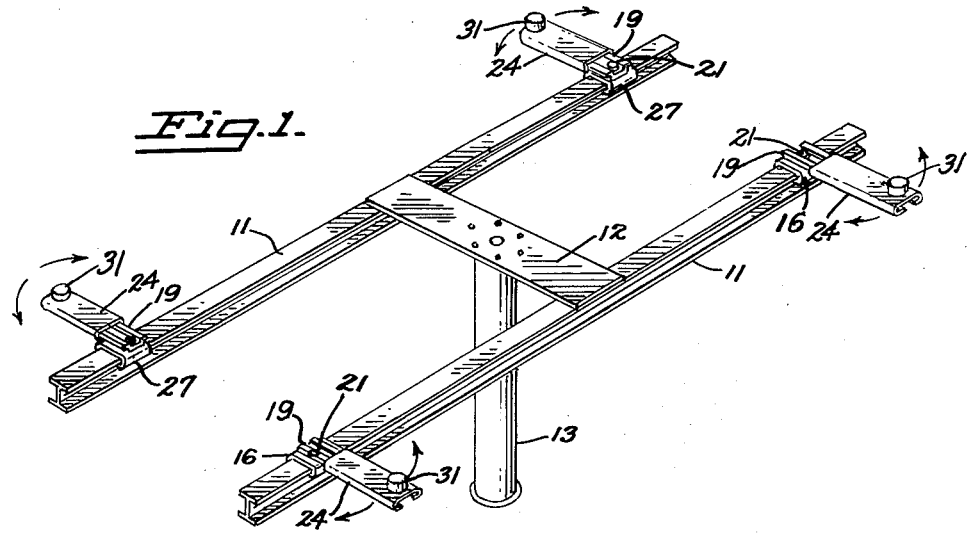
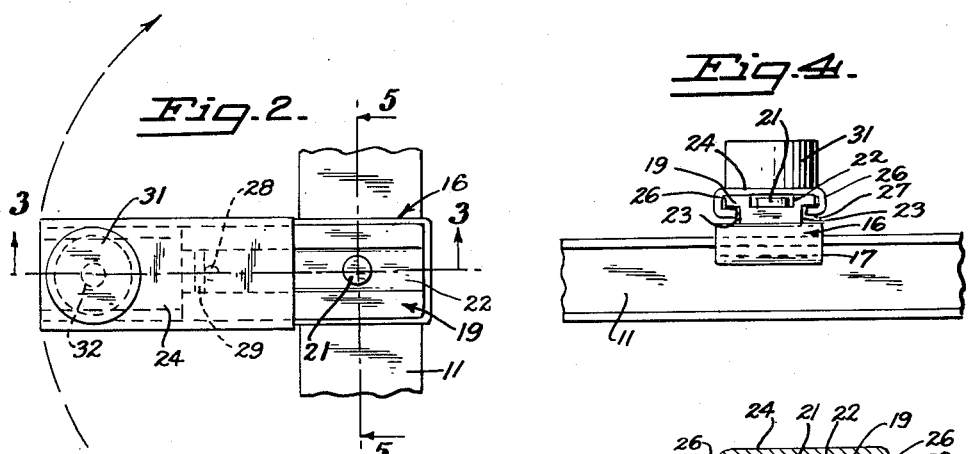
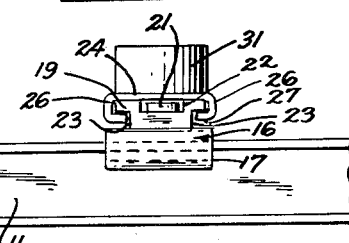
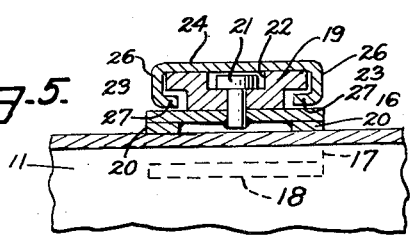
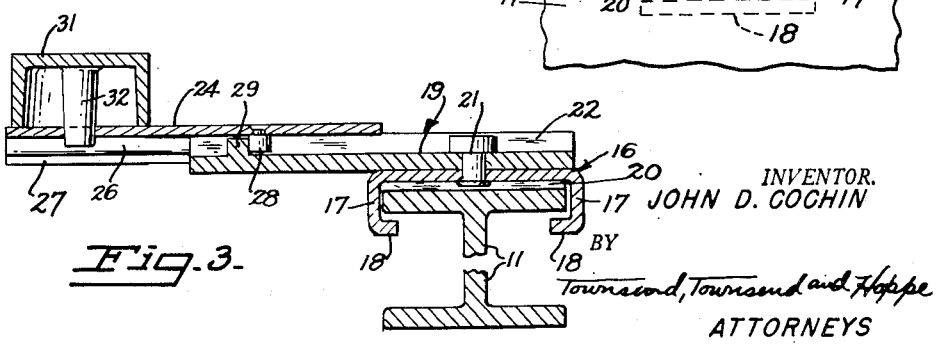
INVENTOR.
JOHN D. COCHIN
BY
Townsend, Townsend and Hoppe
ATTORNEYS 2,777,538
Patented Jan. 15, 1957

2,777,538

VEHICLE FRAME ENGAGING ACCESSORY FOR AUTOMOBILE HOISTS

John D. Cochin, South San Francisco, Calif.

Continuation of application Serial No. 370,354, July 27, 1953. This application June 29, 1956, Serial No. 594,794

5 Claims. (Cl. 187—8.75)

This invention relates to new and useful improvements in frame engaging accessory for automobile hoists, and this application is a continuation of my copending application, Serial No. 370,354, filed July 27, 1953, and now abandoned. The present invention has application as an accessory for hoists which are commonly used to lift automobiles to provide access underneath the automobiles for lubrication, repairs, and similar purposes.

At the present time, automobile frames vary considerably in width and, further, the longitudinal distance between points at which the frame of the automobile can be lifted likewise varies. It is desirable, in order to prevent strains on the vehicles being lifted, to apply the lifting force at four points of the vehicle frame, namely, at points near the wheels on either side of the vehicle. Application of the force at the four points, as aforesaid, requires considerable adjustability in the hoisting equipment to accommodate the various body constructions, and the present invention enhances such adjustability.

It is important in constructing hoists of the character with which this invention is employed to eliminate, so far as possible, connecting structure and cross-members which interfere with access to the underside of the vehicle. In order to facilitate lubrication and repair, the structure of the hoist must be as simple as possible and occupy as little space as necessary.

The present invention accomplishes the two foregoing purposes by affording means for lifting automotive vehicles having wide varieties of frames so that lifting force may be applied to the frames at any convenient points and at the same time eliminating, so far as possible, structure which might obstruct access of the mechanic to the underside of the automobile.

Stated more specifically, it is an object of the invention to provide in combination with a pair of vehicle lift rails a plurality of frame engaging accessories mounted slidably longitudinally of the rails. Each accessory, in turn, comprises a pivot arm and a sliding plate of approximately the same length slidably connected together whereby the overall length of the accessory may be varied by extending or retracting the plate relative to the arm. This feature insures greater accessibility to all underparts of a vehcile and is unlike more conventional accessory structures of which I have knowledge and in which there may be provided a comparatively long arm mounting relatively short sliding shoe which can be slidably adjusted lengthwise of the longer arm. The length of the longer arm in such structures remains absolutely fixed, and not infrequently this fixed length of arm creates an obstruction to obtaining free access to a particular undersurface area of a vehicle being serviced or repaired. In other words, such an accessory being neither extensible nor retractable as to overall length, cannot be adjustably located with regard to certain under-areas of the vehicle to which access should be had.

Other objects of the present invention will become apparent upon reading the following specification and referring to the accompanying drawings in which similar characters of reference represent corresponding parts in each of the several views.

In the drawings:

Fig. 1 is a perspective of four accessories installed on a conventional hoist.

Fig. 2 is an enlarged top plan view of an accessory.

Fig. 3 is a vertical section taken substantially along the line 3—3 of Fig. 2.

Fig. 4 is an end elevation of the structure shown in Fig. 2.

Fig. 5 is a vertical section taken substantially along the line 5—5 of Fig. 2.

The present invention is an accessory which may be installed on one of the longitudinal rails of a hoist. A conventional hoist of this character employs two such longitudinal rails 11 which are desirably I-beams having the connecting web vertically disposed, the rails being spaced apart and supported by transverse member 12 to which they are welded, the transverse member 12 at its center resting upon the top of a hydraulic piston 13. Thus, when the piston 13 is raised by means well known in this art, the two rails 11 are raised vertically.

In lifting a vehicle, it is desirable, in order to prevent strain, to apply the lifting force on the side frame members and preferably the lifting force is applied at four remote points, two adjacent the forward end and two adjacent the rearward end of the vehicle on opposite sides thereof. By reason of the fact that the design of automotive vehicles results in wide variations in the desired four points of suspension, the present invention enables a single hoist to be utilized to support a wide variety of vehicles.

In order to afford such adjustability, four accessories, which are substantially identical in construction, are employed. Each said accessory employs a shoe 16 which slides longitudinally along the top flange of the rail 11, the side edges 17 of said shoe being turned down along the edge of the top flange of the beam and then turned under the top flange as indicated by reference numeral 18 so that the shoe will slide along the beam but can only be removed from the beam by sliding the accessory off the end of the beam.

Pivoted arm 19 is connected to shoe 16 by means of pivot pin 21 which has an enlarged head fitting within a central, longitudinal groove 22 in the top surface of arm 19. The fit of the shank of pivot pin 21 within the aperture in arm 19 through which it passes is sufficiently loose to allow a 360° turning movement of arm 19 relative to shoe 16. The lower end of the shank of pivot pin 21 is welded to shoe 16 and in order to prevent the welded end of the pivot pin from interfering with sliding movement of the shoe 16 on the rail, a pair of spacers 20 may be formed on the underside of the shoe 16 so that the shoe actually travels on the spacing members rather than on its undersurface.

Arm 19 is formed with a groove 22 centrally longitudinally along its top surface and grooves 23 are rabbeted along the underside of each longitudinal edge and thus, in effect, provide a rail along which sliding plate 24 may travel. Sliding plate 24 has its side edges 26 turned down and the extremities 27 of edges 26 underneath into the recesses 23 of the rabbeted portions of arm 19. Hence, sliding plate 24 may move longitudinally with respect to pivoted arm 19. In order to maintain sliding plate 24 on arm 19 so that it cannot be dislodged, a pin 20 may be inserted in a suitable aperture in sliding plate 24, which pin extends into the center longitudinal recess 22 in the top surface of arm 19. A block 29 or cross-member extends across one end of the groove 22 and the opposite end of the groove is obstructed by the enlarged head of pivot pin 21. It will thus be seen that the movement of pin 28 is determined by cross-member 29 and head 21, and this in turn limits the movement of sliding plate 24 and prevents the same from being moved off of pivoted arm 19.

On the outer end of plate 24 is a lifting pad 31 which is removable. Pad 31 is preferably circular and considerably raised above the surface of plate 24 so that it may fit into portions of the frame without interfering with nuts, bolts, brackets and the like which may happen to be on the underside of the frame. Circular pad 31 may be formed hollow in order to reduce weight and may be provided with a central internal pin 32 which projects into an aperture adjacent the outer end of plate 24.

*Operation*

In use, before the automobile is placed on the hoist, the arms 19 are turned parallel to the rails 11 so as not to interefere with the passage of the tires. Thereupon the operator swings the arms 19 in such position that the pads 31 are immediately underneath portions of the frame which they are to engage. It will be observed particularly with reference to Figs. 1 and 2 that the arms 19 may be either swung inwardly or outwardly with respect to the rails 11 and thereby automobiles having widely different widths of frames may be accommodated. In placing the pad 31 under the frame in the required position, the operator may swing the arm 19 around pivot pin 21 and may also slide plate 24 over arm 19. The combination of these two movements enables pad 31 to be placed at any angular position about pivot 21 and also at any radial distance from pivot 21. In addition, by sliding shoe 16 on rail 11, the arm 19 may be placed longitudinally at any desired spot on the frame.

A feature of the present invention is that the length of each sliding plate 24 is approximately equal to the length of the arm 19 on which the plate is slidably mounted. It is thus observed that the overall length of each accessory may be variably extended or retracted as determined by the slidable adjustment of plate 24 relative to arm 19. In the drawings, it is appreciated that the minimum overall length of each accessory is obtained when plate 24 is fully retracted and in which position pin 28 abuts head 21. In its retracted position, the frame engaging pad will be located within the vertical plane of the fixed length of arm 19. The maximum overall length of each accessory is reached upon moving plate 24 outwardly to its fully extended position as shown and with pin 28 abutting cross-member 29 (see Fig. 3). In its extended position, the pad 31 will extend outwardly well beyond the vertical plane of the fixed length of arm 19. In the embodiment of the invention shown in the drawings, the maximum length of each accessory may be adjusted to be approximately 1½ times the minimum length thereof. By virtue of the above described assembly of parts, it is entirely feasible to adjustably lengthen or shorten each accessory so as to provide free and unobstructed accessibility to any given under-area of the vehicle. This is unlike other so-called adjustable frame accessories of which I have knowledge in which there is provided merely an accessory arm of fixed length on which is slidably mounted a relatively short axle of frame engaging shoe or jack. In this type of structure, although the sliding shoe may be adjustably located lengthwise of its supporting arm, the shoe will always remain within the vertical plane of its supporting arm of fixed length and thus the overall length of the accessory is always equal to and determined by the fixed length of the arm itself. Hence, it is not possible in such type of device to shorten the overall length of the accessory to render accessible some underpart of a vehicle which may otherwise be obscured or obstructed by the said arm.

Although I have described the invention in some detail by way of illustration and example for purposes of clarity of understanding, it is understood that certain changes and modifications may be practiced within the spirit of the invention and scope of the appended claims.

I claim:

1. A frame engaging accessory for a vehicle lift of the type having at least one rail comprising a sliding shoe formed for sliding movement longitudinally of said rail; a pivot arm rabbeted along the underside of its longitudinal edges; means pivotally connecting said arm and shoe for swinging movement horizontally; a slide member overlying a portion of said arm and having downwardly and inwardly turned longitudinal edges fitting into the rabbeted portions of said arm to provide for longitudinal sliding movement of said slide member relative to said arm, the upper surface of said arm formed with a longitudinal groove; a pin carried by said slide member slidable in said groove; and a pair of abutments carried by said arm adjacent opposite ends of said arm limiting sliding movement of said pin and slide member relative to said arm.

2. An accessory according to claim 1 which further comprises an elevated pad detachably mounted on the outer end of said slide member.

3. In a vehicle lift of the type comprising a pair of elongate parallel rails, and a plurality of vehicle frame engaging accessories slidably mounted on said rails, the combination comprising: each said accessory comprising a sliding shoe mounted for slidable movement longitudinally of an associated rail; an elongate pivot arm rotatably mounted on said shoe for swinging movement in a horizontal plane; an elongate sliding plate of substantially the same length as said pivot arm slidably mounted relative to said arm; a vehicle engaging means carried adjacent the upper and outer end extremities of said sliding plate; the said vehicle engaging means slidably movable with said plate from a retracted position within the vertical plane of the arm, to an extended position located a substantial distance laterally outwardly beyond the vertical plane of said arm.

4. In a vehicle lift of the type comprising a pair of elongate parallel rails, and a plurality of vehicle frame engaging accessories slidably mounted on said rails, the combination comprising: each said accessory comprising a sliding shoe mounted for slidable movement longitudinally of an associated rail; an elongate pivot arm rotatably mounted on said shoe for swinging movement in a horizontal plane; an elongate sliding plate of substantially the same length as said pivot arm; said sliding plate provided with downwardly and inwardly turned longitudinal side edges; said plate slidably mounted on said arm with the downwardly and inwardly turned longitudinal edges of said plate slidably embracing the longitudinal side edges of said arm and retaining said plate from vertical displacement from said arm; vehicle engaging means carried adjacent the upper and outer end extremities of said sliding plate; the said vehicle engaging means slidably movable with said plate from a retracted position within the vertical plane of the arm, to an extended position located a substantial distance laterally outwardly beyond the vertical plane of said arm.

5. The combination of claim 4 and wherein mutually engageable stop members are provided on said arm and plate for limiting the extent of permissible relative sliding movement between said plate and arm in each direction.

No references cited.